(12) United States Patent
Tian et al.

(10) Patent No.: US 11,323,677 B2
(45) Date of Patent: May 3, 2022

(54) WHITE BALANCE ADJUSTMENT METHOD AND APPARATUS, CAMERA AND MEDIUM

(71) Applicant: Hangzhou Hikvision Digital Technology Co., Ltd., Zhejiang (CN)

(72) Inventors: Renfu Tian, Zhejiang (CN); Lei Chen, Zhejiang (CN); Gang Liu, Zhejiang (CN); Feng Zeng, Zhejiang (CN)

(73) Assignee: Hangzhou Hikvision Digital Technology Co., Ltd., Zhejiang (CN)

( * ) Notice: Subject to any disclaimer, the term of this patent is extended or adjusted under 35 U.S.C. 154(b) by 46 days.

(21) Appl. No.: 16/617,881

(22) PCT Filed: May 18, 2018

(86) PCT No.: PCT/CN2018/087462
§ 371 (c)(1),
(2) Date: Nov. 27, 2019

(87) PCT Pub. No.: WO2019/001163
PCT Pub. Date: Jan. 3, 2019

(65) Prior Publication Data
US 2020/0120321 A1    Apr. 16, 2020

(30) Foreign Application Priority Data

Jun. 28, 2017   (CN) .......................... 201710512168.4

(51) Int. Cl.
*H04N 5/235* (2006.01)
*H04N 9/73* (2006.01)
(Continued)

(52) U.S. Cl.
CPC ........... *H04N 9/735* (2013.01); *H04N 5/2351* (2013.01); *H04N 5/243* (2013.01); *H04N 9/77* (2013.01)

(58) Field of Classification Search
CPC ...... H04N 9/735; H04N 5/2351; H04N 5/243; H04N 9/77; H04N 5/58; H04N 9/64; H04N 9/73; H04N 5/225
See application file for complete search history.

(56) References Cited

U.S. PATENT DOCUMENTS 9,307,214 B1   4/2016   Liu et al.
2010/0208099 A1   8/2010   Nomura
(Continued)

FOREIGN PATENT DOCUMENTS

CN   103491357 A   1/2014
CN   103929631 A   7/2014
(Continued)

OTHER PUBLICATIONS

Notification on Grant of Patent Right for Invention of the priority Chinese application No. 201710512168.4, dated Apr. 24, 2020 in 5 pages. (English Translation included).
(Continued)

*Primary Examiner* — James M Hannett
*Assistant Examiner* — Angel L Garces-Rivera
(74) *Attorney, Agent, or Firm* — Knobbe, Martens, Olson & Bear, LLP

(57) ABSTRACT

The application provides a white balance adjustment method, apparatus, camera, and medium. This method includes: obtaining a current image taken by the camera; determining a brightness value of the image and the acquisition parameter values with which the image is captured by the camera, in which the acquisition parameter values includes the exposure time, the exposure gain and the aperture value with which the image is captured by the camera; determining the first white balance gain, according to brightness value, exposure time, exposure gain and aperture value; calculating a second white balance gain with
(Continued)

which the image is captured by the camera, according to the three-primary-color values of the pixel points of the image; adjusting the white balance gain of the camera according to the first white balance gain and the second white balance gain. The white balance gain determined by the embodiment of this application may better compensate for the color difference of the image taken by the camera.

14 Claims, 5 Drawing Sheets

(51) Int. Cl.
*H04N 5/243* (2006.01)
*H04N 9/77* (2006.01)

(56) References Cited

U.S. PATENT DOCUMENTS

2012/0113272 A1 5/2012 Hata
2015/0130981 A1 5/2015 Hagiwara
2015/0281665 A1 10/2015 Wu

FOREIGN PATENT DOCUMENTS

| | | |
|---|---|---|
| CN | 104113744 A | 10/2014 |
| CN | 104202586 A | 12/2014 |
| CN | 105338333 A | 2/2016 |
| CN | 105872500 A | 8/2016 |
| EP | 2426928 A2 | 3/2012 |
| JP | 2016144006 A | 8/2016 |

OTHER PUBLICATIONS

Extended European Search Report for European Application No. 18824358.8, dated Apr. 29, 2020 in 7 pages.
International Search Report for PCT Application No. PCT/CN2018/087462, dated Jul. 23, 2018 in 4 pages.

WHITE BALANCE ADJUSTMENT METHOD AND APPARATUS, CAMERA AND MEDIUM

The application is the U.S. National Phase under 35 U.S.C. § 371 of International Application CN2018/087462, filed May 18, 2018, which claims the priority to Chinese patent application No. 201710512168.4, entitled "WHITE BALANCE ADJUSTMENT METHOD AND, APPARATUS, CAMERA AND MEDIUM", and filed with the China National Intellectual Property Administration on Jun. 28, 2017, which is incorporated herein by reference in its entirety.

TECHNICAL FIELD

The application relates to the field of image processing technology, in particular to a white balance adjustment method, apparatus, camera and medium.

BACKGROUND

Usually, images captured by a camera in different lighting environments will have different effects. For example, in an environment illuminated by a bulb, images captured by a camera may be yellowish. The camera may compensate for the color difference of the image taken by the camera through white balance gain.

In traditional technology, the image processor integrated in the camera may obtain the three-primary-color values of each of the pixel points of the image taken by the camera through the camera head (where the three-primary-colors include red (R), green (G) and blue (B)), and the green value component of the pixel value of all the pixel points, that is, the accumulated value sumG of the G value, the red value component, that is, the accumulated value sumR of the R value, and the blue value component, that is, the accumulated value sumB of the B value, are calculated, and sumG/sumR, sumG/sumB are calculated. Further, (Rgain, Bgain, Ggain)=(sumG/sumR, sumG/sumB, 1) may be determined as the white balance gain.

In some cases, the white balance gain determined by the above method may not be able to compensate for the color difference of the image in different lighting environments.

SUMMARY

This application is to provide a white balance adjustment method, apparatus, camera and medium to solve the problem that the color difference of the image in different lighting environments cannot be effectively compensated for in traditional technology. The specific technical solutions are as follows:

In the first aspect, the application provides a white balance adjustment method, including:

obtaining an image currently captured by a camera;

determining a brightness value of the image and acquisition parameter values with which the image is captured by the camera, wherein the acquisition parameter values include an exposure time, an exposure gain and an aperture value with which the image is captured by the camera;

determining a first white balance gain for the image captured by the camera according to the brightness value, the exposure time, the exposure gain and the aperture value;

calculating a second white balance gain for the image captured by the camera according to three-primary-color values of pixels in the image; and adjusting a white balance gain of the camera according to the first white balance gain and the second white balance gain.

In an example, determining a first white balance gain for the image captured by the camera according to the brightness value, the exposure time, the exposure gain and the aperture value includes:

determining an environmental illumination mode with which the image is captured by the camera according to the brightness value, the exposure time, the exposure gain and the aperture value;

searching for the first white balance gain corresponding to the environmental illumination mode for the image captured by the camera in a prestored table of correspondence between environmental illumination modes and first white balance gains.

In an example, determining the brightness value of the image includes:

obtaining the three-primary-color values of the image currently captured by the camera;

calculating the brightness value of the image according to the three-primary-color values and preset weighted proportions respectively corresponding to each of the three-primary-color values.

In an example, determining an environmental illumination mode with which the image is captured by the camera according to the brightness value, the exposure time, the exposure gain and the aperture value includes:

calculating a first illumination value of a current environment according to the brightness value, the exposure time, the exposure gain and the aperture value, wherein the current environment is an environment where the image is captured by the camera;

mapping the first illumination value to a second illumination value by a piecewise linear mapping method;

comparing the second illumination value with a plurality of illumination thresholds, and determining the environmental illumination mode with which the image is captured by the camera according to the comparison result.

In an example, the first illumination value in the current environment is calculated by a formula of:

$$lux = \log((Y \text{<<} n)/(gain \times shutter/(Fn \times Fn)));$$

wherein, lux is the first illumination value, Y is the brightness value of the image, Y<<n means that the Y is enlarged by $2^n$ times, gain is the exposure gain, shutter is the exposure time, Fn is the aperture value and n is a non-negative integer.

In an example, determining the environmental illumination mode with which the image is captured by the camera according to the comparison result includes:

determining that the environmental illumination mode with which the image is captured by the camera is a sunny day mode, when the second illumination value is greater than or equal to a first illumination threshold;

determining that the environmental illumination mode with which the image is captured by the camera is a cloudy day mode, when the second illumination value is less than the first illumination threshold and greater than or equal to the second illumination threshold;

obtaining a time at which the image is captured by the camera, a scene mode configured by the user and stored historical data of white balance gain, when the second illumination value is less than the second illumination threshold and greater than or equal to the third illumination threshold, and determining whether the time at which the image is captured by the camera, the scene mode configured by the user and the stored historical data of white balance gain all satisfy an outdoor scene mode condition;

if so, determining that the environmental illumination mode with which the image is captured by the camera is a cloudy day mode, and if not, determining that the environmental illumination mode with which the image is captured by the camera is an artificial light source mode;

determining that the environmental illumination mode with which the image is captured by the camera is an artificial light source mode, when the second illumination value is less than the third illumination threshold.

In an example, determining the first white balance gain corresponding to the environmental illumination modes includes:

searching for the first white balance gain corresponding to the environmental illumination mode with which the image is captured by the camera in a prestored table of correspondence between environmental illumination modes and first white balance gains.

In an example, calculating a second white balance gain for the image captured by the camera according to the three-primary-color values of pixels in the images includes:

searching for a preset color gamut corresponding to the environmental illumination mode with which the image is captured by the camera in a prestored table of correspondence between environmental illumination modes and first white balance gains as a target preset color gamut;

determining pixels satisfying a preset condition in the image, wherein the preset condition is that a ratio of R value to G value, a ratio of B value to G value of a pixel in the image are all in the target preset color gamut;

calculating an accumulated value of R value, an accumulated value of G value and an accumulated value of B value of the pixels satisfying the preset condition, and calculating the second white balance gain for the image captured by the camera according to the accumulated value of R value, the accumulated value of G value and the accumulated value of B value.

In an example, calculating the second white balance gain for the image captured by the camera according to the accumulated value of R value, the accumulated value of G value and the accumulated value of B value includes:

calculating the second white balance gain for the image captured by the camera according to the following formula:

$$\begin{cases} Rgain = sumG/sumR \\ Bgain = sumG/sumB \\ Ggain = 1 \end{cases}$$

wherein, (Rgain, Bgain, Ggain) is the second white balance gain for the image captured by the camera, sumR is the accumulated value of the R value, sumG is the accumulated value of the G value and sumB is the accumulated value of the B value.

In an example, adjusting the white balance gain of the camera according to the first white balance gain and the second white balance gain includes:

adjusting the white balance gain of the camera to the second white balance gain if the number of pixels satisfying the preset condition is larger than a preset threshold of the number of the white points; wherein, the preset condition is that a ratio of R value to G value and a ratio of B value to G value of a pixel in the image are all in a target preset color gamut, and the target preset color gamut is a preset color gamut corresponding to the environmental illumination mode with which the image is captured by the camera;

adjusting the white balance gain of the camera to a weighted value between the second balance gain and the first white balance gain if the number of pixels satisfying the preset conditions is less than or equal to the preset threshold of the number of the white points.

In the second aspect, the application provides a white balance adjustment apparatus, including:

an image acquisition module, configured for obtaining an image currently captured by a camera;

a parameter value determination module, configured for determining a brightness value of the image and acquisition parameter values with which the image is captured by the camera, wherein the acquisition parameter values include an exposure time, an exposure gain and an aperture value with which the image is captured by the camera;

a first white balance determination module, configured for determining a first white balance gain for the image captured by the camera according to the brightness value, the exposure time, the exposure gain and the aperture value;

a second white balance determination module, configured for calculating a second white balance gain for the image captured by the camera according to three-primary-color values of pixels in the image; and a white balance gain adjustment module, configured for adjusting a white balance gain of the camera according to the first white balance gain and the second white balance gain.

In an example, the first white balance determination module includes a determination unit and a searching unit;

the mode determination unit is configured for determining an environmental illumination mode with which the image is captured by the camera according to the brightness value, the exposure time, the exposure gain and the aperture value;

the searching unit is configured for searching for the first white balance gain corresponding to the environmental illumination mode for the image captured by the camera in a prestored table of correspondence between environmental illumination modes and first white balance gains.

In an example, the parameter value determination module is specifically configured for:

obtaining the three-primary-color values of the image currently captured by the camera;

calculating the brightness value of the image according to the three-primary-color values and preset weighted proportions respectively corresponding to each of the three-primary-color values.

In an example, the mode determination unit is specifically configured for:

calculating a first illumination value of a current environment according to the brightness value, the exposure time, the exposure gain and the aperture value, wherein the current environment is an environment where the image is captured by the camera;

mapping the first illumination value to a second illumination value by a piecewise linear mapping method;

comparing the second illumination value with a plurality of illumination thresholds, and determining the environmental illumination mode with which the image is captured by the camera according to the comparison result.

In an example, the mode determination unit is specifically configured for calculating the first illumination value of the current environment by a formula of:

$$lux = \log((Y<<n)/(gain \times shutter/(Fn \times Fn)));$$

wherein, lux is the first illumination value, Y is the brightness value of the image, Y<<n means that the Y is enlarged by $2^n$ times, gain is the exposure gain, shutter is the exposure time, Fn is the aperture value and n is a non-negative integer.

In an example, the mode determination unit is specifically configured for:

determining that the environmental illumination mode with which the image is captured by the camera is a sunny day mode, when the second illumination value is greater than or equal to a first illumination threshold;

determining that the environmental illumination mode with which the image is captured by the camera is a cloudy day mode, when the second illumination value is less than the first illumination threshold and greater than or equal to the second illumination threshold;

obtaining a time at which the image is captured by the camera, a scene mode configured by the user and stored historical data of white balance gain, when the second illumination value is less than the second illumination threshold and greater than or equal to the third illumination threshold, and determining whether the time at which the image is captured by the camera, the scene mode configured by the user and the stored historical data of white balance gain all satisfy an outdoor scene mode condition;

if so, determining that the environmental illumination mode with which the image is captured by the camera is a cloudy day mode, and if not, determining that the environmental illumination mode with which the image is captured by the camera is an artificial light source mode;

determining that the environmental illumination mode with which the image is captured by the camera is an artificial light source mode, when the second illumination value is less than the third illumination threshold.

In an example, the second white balance determination module is specifically configured for:

searching for a preset color gamut corresponding to the environmental illumination mode with which the image is captured by the camera in a prestored table of correspondence between environmental illumination modes and first white balance gains as a target preset color gamut;

determining pixels satisfying a preset condition in the image, wherein the preset condition is that a ratio of R value to G value, a ratio of B value to G value of a pixel in the image are all in the target preset color gamut;

calculating an accumulated value of R value, an accumulated value of G value and an accumulated value of B value of the pixels satisfying the preset condition, and calculating the second white balance gain for the image captured by the camera according to the accumulated value of R value, the accumulated value of G value and the accumulated value of B value.

In an example, the second white balance determination module is specifically configured for:

calculating the second white balance gain for the image captured by the camera according to the following formula:

$$\begin{cases} Rgain = sumG/sumR \\ Bgain = sumG/sumB \\ Ggain = 1 \end{cases}$$

wherein, (Rgain, Bgain, Ggain) is the second white balance gain for the image captured by the camera, sumR is the accumulated value of the R value, sumG is the accumulated value of the G value and sumB is the accumulated value of the B value.

In an example, the white balance gain adjustment module is specifically configured for:

adjusting the white balance gain of the camera to the second white balance gain if the number of pixels satisfying the preset condition is larger than a preset threshold of the number of the white points; wherein, the preset condition is that a ratio of R value to G value and a ratio of B value to G value of a pixel in the image are all in a target preset color gamut, and the target preset color gamut is a preset color gamut corresponding to the environmental illumination mode with which the image is captured by the camera;

adjusting the white balance gain of the camera to a weighted value between the second balance gain and the first white balance gain if the number of pixels satisfying the preset conditions is less than or equal to the preset threshold of the number of the white points.

In the third aspect, the application also provides a camera, including:

a camera head, configured for capturing images;

an image processor, configured for obtaining an image currently captured by the camera head; determining a brightness value of the image and acquisition parameter values with which the image is captured by the camera head, wherein the acquisition parameter values include an exposure time, an exposure gain and an aperture value with which the image is captured by the camera; determining a first white balance gain for the image captured by the camera according to the brightness value, the exposure time, the exposure gain and the aperture value; calculating a second white balance gain for the image captured by the camera through the camera head according to three-primary-color values of pixels in the image; and adjusting a white balance gain of the camera according to the first white balance gain and the second white balance gain.

In the fourth aspect, the application also provides a machine-readable storage medium for storing machine-executable instructions, wherein, the machine executable instructions are invoked and executed by an image processor to cause the image processor to implement the steps of the white balance adjustment method according to embodiments of the application.

In the fifth aspect, the application provides an application program, wherein, the application program is executed by a processor to implement the steps of the white balance adjustment method according to embodiments of the application.

In this application, on the basis of determining the environmental illumination modes with which the image is captured by the camera, the first white balance gain of the image is obtained, and then the white balance gain of the camera may be adjusted according to the first white balance gain and the second white balance gain calculated based on the three-primary-color values of each of the pixels corresponding to the number of the white points. When the white balance gain of the camera is adjusted, the three-primary-color values of the pixels corresponding to the number of the white points and the environmental illumination modes are combined, instead of only considering the single factor of the three-primary-color values of the pixel points. Therefore, the problem that the color difference of the image in different lighting environments cannot be effectively compensated in traditional technology may be solved, and then the better images may be obtained. It should be understood that any product or method for implementing the embodiments of the present disclosure does not necessarily require all of the advantages described above.

In this implementation, a first white balance gain value for the image captured by the camera may be determined based on the brightness value, exposure time, exposure gain and aperture value when an image is captured by the camera, wherein, the brightness value, exposure time, exposure gain and aperture value when an image is captured by the camera may characterize, to some extent, the actual environment of the camera when an image is captured, such as lighting environments; then, a second white balance gain for the image captured by the camera is calculated based on the three-primary-color values of the pixels in the obtained image; the white balance gain of the camera is adjusted according to the first white balance gain value and the second white balance gain value. Adjusting of the white balance gain of the camera is not only based on the three-primary-color values of the pixels, but also combines the actual environment and the three-primary-color values of the pixels. To a certain extent, it may solve the problem that the image color difference cannot be effectively compensated for in different lighting environments, and thus obtaining images with better quality. It should be understood that any product or method for implementing the embodiments of the present disclosure does not necessarily require all of the advantages described above.

BRIEF DESCRIPTION OF THE DRAWINGS

In order to more clearly describe the technical solution of the embodiments of the application or of the prior art, drawings needed in the embodiments and the prior art will be briefly described below. Obviously, the drawings described below are for only some embodiments of the application, one of ordinary skills in the art can also obtain other drawings based on these drawings without any creative efforts.

DETAILED DESCRIPTION

The technical solution of the application will be described in detail with reference to the drawings of embodiments of the application. Obviously, the embodiments described are only some instead of all of the embodiments of the application. All other embodiments obtained by those of ordinary skills in the art based on the embodiments herein without any creative efforts are within the scope of the application.

It should be noted that, without conflict, embodiments in the application and features in the embodiments may be combined with each other. The application will be described in detail below with reference to the drawings and in combination with embodiments.

In order to solve the problem that image color difference in different lighting environments cannot be effectively compensated in traditional technology, embodiments of the application provide a white balance adjustment method, apparatus, camera and medium.

First, a white balance adjustment method according to an embodiment of the application will be described below.

It should be noted that a white balance adjustment method according to an embodiment of this application may be applied in a camera. Specifically, the white balance adjustment method according to an embodiment of the application may be implemented by a white balance adjustment apparatus, which is functional software running in the camera.

Figure 1A:
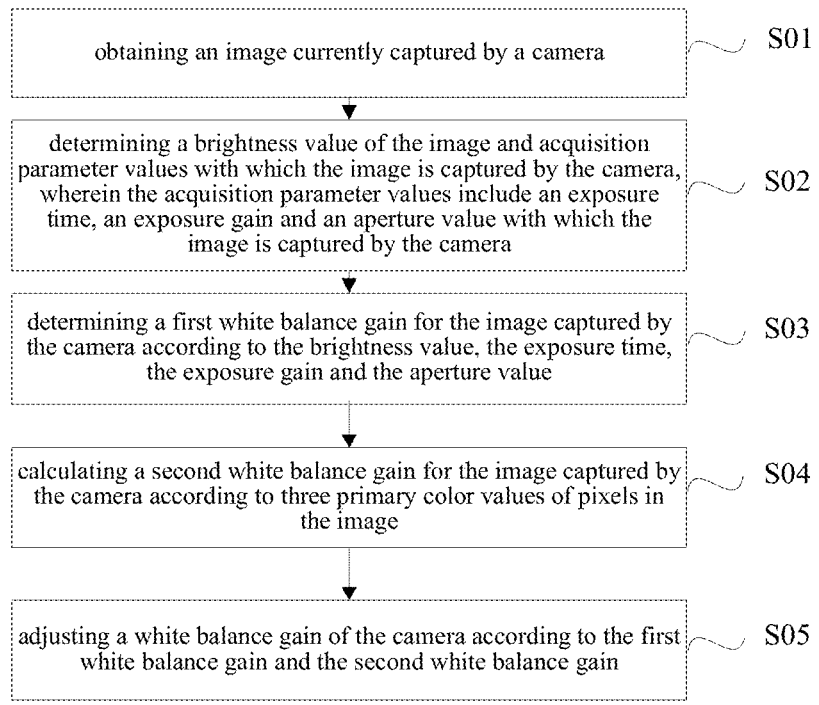
FIG. 1A is a flowchart of a white balance adjustment method according to an embodiment of the application.

The white balance adjustment method according to the embodiment of the application, as shown in FIG. 1A, may include the following steps:

At S01: an image currently captured by the camera is obtained.

On the one hand, the white balance adjustment method according to the embodiment of the application may be applied in any electronic device that may obtain images. The electronic device may be computers, smart phones, etc. In this case, the electronic device may connect the camera to capture images through the camera, and the camera may capture images through the camera head. Then, the electronic device may obtain the images captured by the camera, and perform the subsequent white balance adjustment process. On the other hand, the white balance adjustment method according to the embodiment of the application may be applied in a camera, which captures images through the camera head and performs subsequent white balance adjustment process.

In one case, the functional software that implements the white balance adjustment method according to the embodiment of the application may be in a form of special client software, or in a form of a plug-in of the related client software. For the convenience of description, the functional software that implements the white balance adjustment method according to the embodiment of the application is called the white balance adjustment apparatus. The white balance adjustment apparatus may be installed in the above electronic device or camera.

In order to achieve a better image effect, the white balance adjustment process may be triggered whenever the camera is turned on, to adjust the white balance of the camera based on the white balance adjustment method according to the embodiment of the application. It is also possible to trigger the white balance adjustment process after the white balance adjustment function of the camera is turned on, to adjust the white balance of the camera based on the white balance adjustment method according to the embodiment of the application, and so on.

At S02: a brightness value of the image and values of acquisition parameters with which the image is captured by the camera are determined, wherein the acquisition parameter values include exposure time, exposure gain and an aperture value with which the image is captured by the camera.

In this step, after obtaining the image currently captured by the camera, the white balance adjustment apparatus may determine the brightness value of the image through the obtained images. Moreover, the values of the acquisition parameters with which the image is captured by the camera may be obtained. The acquisition parameters may be exposure parameters. In the embodiment of the application, the values of the acquisition parameters are called the acquisition parameter values. The acquisition parameter values may include exposure time, exposure gain and an aperture value.

Wherein, due to the influence of environmental factors and time factors when the image is captured by the camera, different images captured by the camera may have different brightness values, and the exposure time, exposure gain and aperture value may also be different.

The above exposure time refers to the time for which the shutter is open such that the light is projected onto the sensitive surface of the photographic sensitive material. The longer the exposure time is, the more the light is projected onto the sensitive surface of the photographic sensitive material. If the light condition in the shooting environment is poor, the exposure time may be prolonged appropriately, and if the light condition in the shooting environment is good, the exposure time may be shortened appropriately. The above exposure gain is exposure compensation. An aperture, also known as a relative aperture, is an apparatus used to control the quantity of light passing through the lens and thus entering into the photosensitive surface of the camera body, which is usually arranged in the lens. The above aperture value is the relative value of the focal length of the camera lens divided by the diameter of the lens through light.

At S03: a first white balance gain with which the image is captured by the camera is determined according to the brightness value, exposure time, exposure gain and aperture value.

In an embodiment of the application, the white balance adjustment apparatus may determine a first white balance gain with which the image is captured by the camera based on the brightness value, exposure time, exposure gain and aperture value obtained when an image is currently captured.

In one implementation, the white balance adjustment apparatus may firstly determine an environmental illumination mode when an image is captured currently by the camera according to the brightness value, exposure time, exposure gain and aperture value, and then determine the first white balance gain corresponding to the environmental illumination mode; that is, the S03 mentioned above may include the S103 and S104 described below.

The white balance adjustment apparatus determining an environmental illumination mode when an image is captured currently by the camera based on the brightness value, exposure time, exposure gain and aperture value obtained when an image is currently captured may include the white balance adjustment apparatus calculating a first illumination value when an image is currently captured by the camera based on the brightness value, exposure time, exposure gain and aperture value obtained when an image is currently captured, wherein, the first illumination value may characterize the actual environment where the camera captures the image currently, for example, the quantity of visible light received per unit area on the camera's photosensitive surface. Furthermore, in an embodiment of the application, the white balance adjustment apparatus may determine the environmental illumination mode when an image is captured currently by the camera based on the first illumination value, wherein, the environmental illumination mode mentioned above may be a mode set in advance based on different illumination value ranges corresponding to various environmental conditions; that is to say, different environmental illumination modes may correspond to different illumination ranges. In one case, the above environmental illumination modes may include a sunny day mode, a cloudy day mode and an artificial light source mode.

The white balance adjustment apparatus may determine a first white balance gain when an image is captured by the camera based on the determined environmental illumination mode. with which the image is captured by the camera In an embodiment of the application, the determining a first white balance gain when an image is captured by the camera based on the determined environmental illumination mode may be include: pre-storing a correspondence between the environmental illumination mode and the first white balance gain; after determining the environmental illumination modes when an image is captured currently by the camera, the white balance adjustment apparatus obtaining the above-mentioned correspondence between environmental illumination modes and the first white balance gain, and determining the first white balance gain when an image is captured by the camera based on the obtained correspondence between environmental illumination modes and the first white balance gain and the determined environmental illumination modes when an image is captured currently by the camera.

In another implementation, the white balance adjustment apparatus may firstly calculate the first illumination value when an image is captured currently by the camera according to the brightness value, exposure time, exposure gain and aperture value, and then determine the first white balance gain for the image captured by the camera based on the first illumination value. In the embodiment of the application, determining the first white balance gain for the image captured by the camera based on the first illumination value with which the image is captured by the camera may be include: pre-storing a correspondence between the illumination value and the first white balance gain; after the white balance adjustment apparatus determining the first illumination value, the white balance adjustment apparatus may obtain the above-mentioned correspondence between the illumination value and the first white balance gain, and then determine the first white balance gain for the image captured by the camera based on the obtained correspondence and the calculated first illumination value.

At S04: a second white balance gain for the image captured by the camera is calculated according to three-primary-color values of pixels in the image.

In this step, the three-primary-colors of the pixel in the image may include red (R), green (G) and blue (B). The above three-primary-colors may include green value component (namely G value), red value component (namely R value) and blue value component (namely B value) of the pixel values of pixels.

In one case, the white balance adjustment apparatus may calculate a white balance gain for the image captured by the camera as a second white balance gain based on the three-primary-color values of all the pixels in the image. In another case, the white balance adjustment apparatus may calculate the white balance gain for the image captured by the camera as the second white balance gain based on the three-primary-color values of the pixels in the image that satisfy a preset condition.

At S05, the white balance gain of the camera is adjusted according to the first white balance gain and the second white balance gain.

In an embodiment of the application, the white balance adjustment apparatus may set weights in advance for the first white balance gain and the second white balance gain respectively, and adjust the white balance of the camera based on the first white balance gain and its corresponding weight, and the second white balance gain and its corresponding weight.

In this implementation, a first white balance gain value for the image captured by the camera may be determined based on the brightness value, exposure time, exposure gain and aperture value when an image is captured by the camera, wherein, the brightness value, exposure time, exposure gain and aperture value when an image is captured by the camera may characterize, to some extent, the actual environment of the camera when an image is captured, such as lighting environments; then, a second white balance gain for the image captured by the camera is calculated based on the three-primary-color values of the pixels in the obtained image; the white balance gain of the camera is adjusted according to the first white balance gain value and the second white balance gain value. Adjusting of the white balance gain of the camera is not only based on the three-primary-color values of the pixels, but also combines the actual environment and the three-primary-color values of the pixels. To a certain extent, it may solve the problem that the image color difference cannot be effectively compensated for in different lighting environments, and thus obtaining images with better quality.

In an optional implementation, the above step (S03) of determining the first white balance gain for the image captured by the camera according to the brightness value, exposure time, exposure gain and aperture value may include:

determining an environmental illumination mode with which the image is captured by the camera according to the brightness value, the exposure time, the exposure gain and the aperture value;

searching for the first white balance gains corresponding to the environmental illumination mode with which the image is captured by the camera, in a prestored correspondence table between environmental illumination modes and first white balance gains.

After obtaining the brightness value, exposure time, exposure gain and aperture value when an image is currently captured by the camera, the white balance adjustment apparatus may calculate the first illumination value with which the image is captured by the camera based on the brightness value, exposure time, exposure gain and aperture value; and determine the environmental illumination mode with which the image is captured by the camera based on the calculated first illumination value with which the image is captured by the camera; determine the first white balance gain corresponding to the determined environmental illumination mode based on the correspondence table as the first white balance gain with which the image is captured by the camera.

Specifically, determining the environmental illumination mode with which the image is captured by the camera according to the brightness value, exposure time, exposure gain and aperture value may include steps A-C as described below.

Figure 1B:
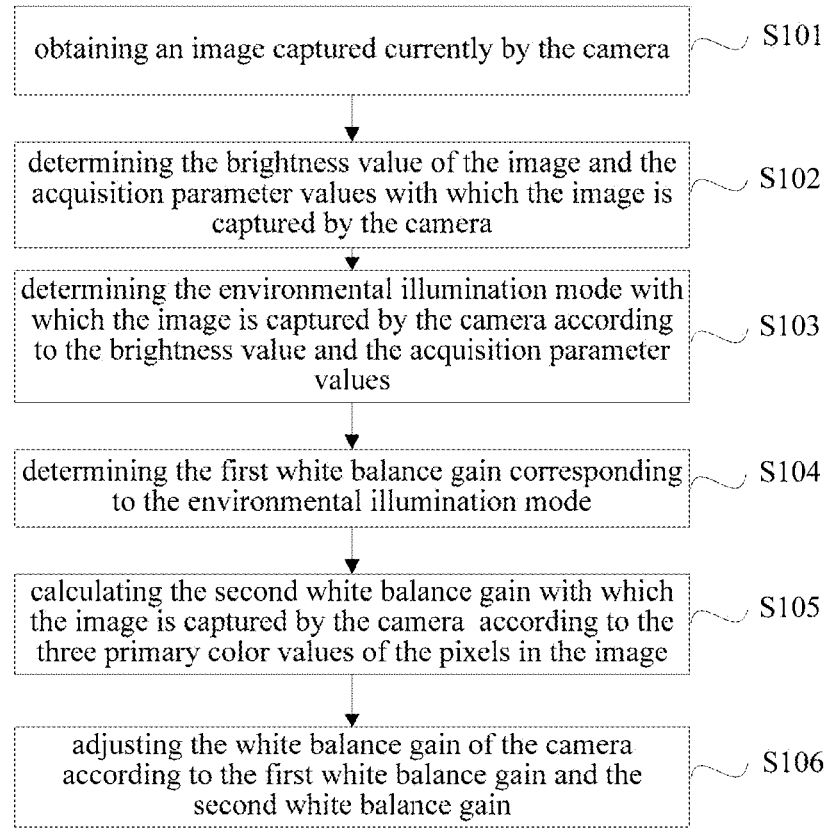
FIG. 1B is an another flowchart of a white balance adjustment method according to an embodiment of the application.

In one implementation, as shown in FIG. 1B, a white balance adjustment method according to an embodiment of the application may include the following steps.

At S101: an image captured currently by the camera is obtained.

The camera head of the camera may capture images, and the white balance adjustment apparatus may obtain images captured by the camera head to adjust the white balance gain of the camera.

It should be noted that, in order to achieve better image effects, the white balance of the camera may be adjusted every time the camera is turned on; alternatively, the white balance of the camera may be adjusted after the white balance adjustment function is enabled.

At S102, the brightness value of the image and the acquisition parameter values with which the image is captured by the camera are determined.

In an embodiment of the application, due to the influence of environmental factors and time factors when the image is captured by the camera, different images captured by the camera may have different brightness values. The white balance adjustment apparatus may determine the brightness value of the image currently captured by the camera and the acquisition parameter values with which the image is captured by the camera.

That is to say, in the embodiment of the application, due to the influence of environmental factors and time factors when the image is captured by the camera, different images captured by the camera may have different brightness values. After obtaining the image currently captured by the camera, the white balance adjustment apparatus may continue to determine the brightness value of the image currently captured by the camera and the acquisition parameter values with which the image is captured by the camera.

In one implementation, the white balance adjustment apparatus may obtain the three-primary-color values of the image currently captured by the camera. Thus, the brightness values of the image may be calculated according to the three-primary-color values of the image and a preset weighted proportion corresponding to each of the three-primary-color values, in which the three-primary-colors of the image include red (R), blue (B) and green (G).

In one case, the brightness value of the image can be calculated according to a formula: Y=aR+bG+cB, in which a, b, and c are the preset weighted proportion for the three-primary-colors respectively. For example, when a is 0.3, b is 0.6, and c is 0.1, Y=0.1×R+0.6×G+0.1×B, wherein the values of a, b, and c are not limited to the above values.

In one implementation, the acquisition parameter values with which the image is captured by the camera may include the exposure time, exposure gain and aperture value with which the image with which by the camera, to which the application is not limited. The above exposure time refers to the time for which the shutter is open such that the light is projected onto the sensitive surface of the photographic sensitive material. The longer the exposure time is, the more the light will enter, which is suitable for the case where the light condition is relatively poor. On the contrary, a shorter exposure time is suitable for the case where the light is good. The exposure gain is exposure compensation. Aperture, also known as a relative aperture, is an apparatus used to control the quantity of light passing through the lens and thus entering into the photosensitive surface of the camera body, which is arranged usually in the lens. The aperture value is the relative value of the focal length of the camera lens divided by the diameter of the lens through light.

In one implementation, the acquisition parameter values with which the image is captured by the camera may include the exposure time, exposure gain and aperture value, and the like with which the image is captured by the camera, to which the application is not limited. The above exposure time refers to the time for which the shutter is open such that the light is projected onto the sensitive surface of the photographic sensitive material. The longer the exposure time is, the more the light is projected onto the sensitive surface of the photographic sensitive material. If the light condition in the shooting environment is poor, the exposure time may be prolonged appropriately, and if the light condition in the shooting environment is good, the exposure time may be shortened appropriately. The above exposure gain is exposure compensation. An aperture, also known as a relative aperture, is an apparatus used to control the quantity of light passing through the lens and thus entering into the photosensitive surface of the camera body, which is usually arranged in the lens. The above aperture value is the relative value of the focal length of the camera lens divided by the diameter of the lens through light.

At S103, the environmental illumination mode with which the image is captured by the camera is determined according to the brightness value and the acquisition parameter values.

After obtaining the brightness value of the image, the environmental illumination mode with which the image is captured by the camera may be determined according to the brightness value of the image and the acquisition parameter values with which the image is captured by the camera, and then the white balance gain to be used is determined based on the environmental illumination mode.

In an example, in a specific implementation, determining the environmental illumination mode with which the image is captured by the camera according to the brightness value and the acquisition parameter values may include the following steps A-C.

At Step A, a first illumination value of a current environment is calculated according to the brightness value of the image and the acquisition parameter values with which the image is captured by the camera, wherein the current environment is the environment where the camera captures images;

when the acquisition parameter values includes the exposure time, the exposure gain and the aperture value with which the image is captured by the camera, the first illumination value of the current environment may be calculated by using the following formula:

$$lux = \log((Y<<n)/(gain \times shutter/(Fn \times Fn)));$$

wherein, lux is the first illumination value, Y is the brightness value of the image, $Y<<n$ means that the Y is enlarged by $2^n$ times, gain is the exposure gain, shutter is the exposure time, Fn is the aperture value and n is the non-negative integer.

In order to facilitate calculation, the brightness value Y of the image may be enlarged by certain times, for example, $Y<<n$ indicates that the Y is enlarged by $2^{10}$ times, that is, the brightness value of the image will be enlarged by 1024 times. It can be seen that, when the brightness value, exposure gain, exposure time and aperture value of the image are obtained, the first illumination value of the current environment with which the image is captured by the camera can be calculated according to the above formula.

Figure 2:
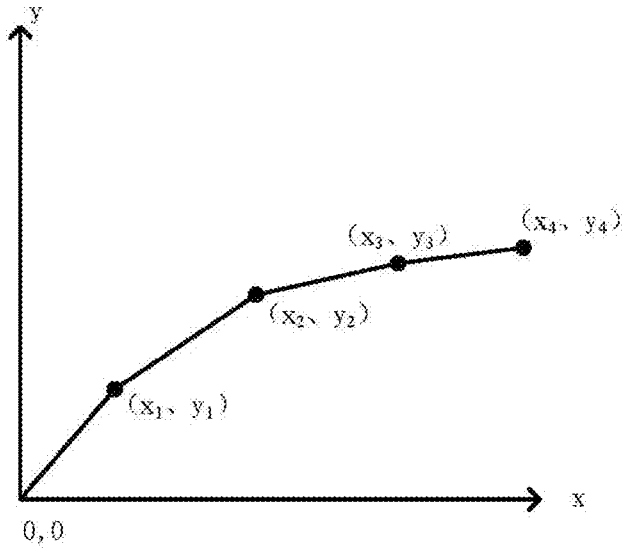
FIG. 2 is a schematic diagram for mapping the first illumination value to the second illumination value using the piecewise linear mapping method according to an embodiment of the application.

At step B, the first illumination value is mapped to a second illumination value by a piecewise linear mapping method;

The process of step B is to obtain the second illumination value corresponding to the first illumination value, and the second illumination value is the actual value measured by the illuminometer in different illumination environments. In one case, the first illumination value and the second illumination value may be piecewise mapped. As shown in FIG. 2, the specific process of the piecewise mapping may be:

assuming that x are the illumination values calculated in different environments with which the image is captured by the camera and Y is the actual illumination value measured in the same environment; that is, $x_1$, $x_2$, $x_3$, $x_4$ ... $x_n$ are the first illumination values in different environments, and $y_1$, $y_2$, $y_3$, $y_4$ ... $y_n$ are the actual illumination values measured in the same environments; that is, the lighting environments of $x_1$ and $y_1$ are the same, the lighting environments of $x_2$ and $y_2$ are the same, and lighting environments of $x_3$ and $y_3$ are the same, and the lighting environments of $x_n$ and $y_n$ are the same. When the first illumination value is $x_i$ (i=1, 2, 3, 4 ... n), the second illumination value may be $y_i$ (i=1, 2, 3, 4 ... n), and when the first illumination value x is between $x_{i-1}$ and $x_i$, the second illumination value may be: $y = \Box x - x_i \Box / \Box x_{i-1} - x_i \Box \times \Box y_{i-1} - y_i \Box + y_i$.

For example, when the first illumination value x is between $x_1$ and $x_2$, the second illumination value may be $y = \Box x - x_2 \Box / \Box x_1 - x_2 \Box \times \Box y_1 - y_{2E} \Box + y_2$. For example, when the first illumination value x is between $x_3$ and $x_4$, the second illumination value can be $y = \Box x - x_4 \Box / \Box x_3 - x_4 \Box \times \Box y_3 - y_4 \Box + y_4$.

At Step C: the second illumination value is compared with a plurality of illumination thresholds, and the environmental illumination mode with which the image is captured by the camera is determined according to the comparison result.

The plurality of illumination thresholds may include, but are not limited to, a first illumination threshold (th1), a second illumination threshold (th2), and a third illumination threshold (th3). The environmental illumination mode with which the image is captured by the camera includes, but is not limited to, a sunny day mode, a cloudy day mode and an artificial light source mode.

In one implementation, determining the environmental illumination mode with which the image is captured by the camera based on the comparison result of the second illumination value (which may be expressed as lux2) with a plurality of illumination thresholds may include:

determining the environmental illumination mode with which the image is captured by the camera as a sunny day mode, when the second illumination value is greater than or equal to the first illumination threshold, that is lux2≥th1;

determining the environmental illumination mode with which the image is captured by the camera as a cloudy day mode, when the second illumination value is less than the first illumination threshold and greater than or equal to the second illumination threshold, that is th2≤lux2<th1;

obtaining the time at which the image is captured by the camera, the scene mode configured by the user and the stored historical data of the white balance gain, when the second illumination value is less than the second illumination threshold and greater than or equal to the third illumination threshold, that is th3≤lux2<th2; determining whether the time at which the image is captured by the camera, the scene mode configured by the user and the stored historical data of the white balance gain satisfy the condition for an outdoor scene mode; if the time at which the image is captured by the camera, the scene mode configured by the user and the stored historical data of the white balance gain satisfy the condition for an outdoor scene mode, determining the environmental illumination mode with which the image is captured by the camera as a cloudy day mode; if the time at which the image is captured by the camera, the scene mode configured by the user and the stored historical data of the white balance gain do not satisfy the condition for the outdoor scene mode, determining the environmental illumination mode with which the image is captured by the camera as an artificial light source mode; and determining the environmental illumination mode with which the image is captured by the camera as an artificial light source mode, when the second illumination value is less than the third illumination threshold.

The stored historical data of the white balance gain may be: the white balance gains calculated in the calculating processes before the current process of calculating the white balance gain.

In one case, the first illumination threshold, the second illumination threshold and the third illumination threshold mentioned above may be preset according to experience. Moreover, the above condition for the outdoor scene mode may be preset according to experience.

For example, when th1=10000, th2=5000 and th3=2000, the second illumination value is compared with the first illumination threshold (th1), the second illumination threshold (th2), and the third illumination threshold (th3), and the environmental illumination mode with which the image is captured by the camera are determined according to the comparison result.

For example, the time at which the image is captured by the camera, the scene mode configured by the user and the stored historical data of the white balance gain satisfying the condition for the outdoor scene mode may include: the time at which the image is captured by the camera is between 9:00 a.m. and 17:00 p.m., the scene mode configured by the user is an outdoor mode, and there is a second illumination value greater than the first illumination threshold in the stored historical data of white balance gain.

At S104, the first white balance gain corresponding to the environmental illumination mode is determined.

In an embodiment of the application, a table of correspondence between environmental illumination modes and first white balance gains is prestored. After determining the environmental illumination mode with which the image is captured by the camera, the white balance adjustment apparatus may search for a first white balance gain corresponding to the environmental illumination mode with which the image is captured by the camera in the prestored table of correspondence between environmental illumination modes and first white balance gains. As shown in Table 1, when the environmental illumination mode is determined, a first white balance gain corresponding to the current environmental illumination modes may be determined according to the correspondence in Table 1. Table 1 shows the first white balance gains respectively corresponding to the environmental illumination modes of the sunny day mode and the cloudy day mode.

TABLE 1

| Environmental illumination mode | First white balance gains |
| --- | --- |
| Sunny day mode | avgRgain = sun_avg_Rgain |
|  | avgBgain = sun_avg_Bgain |
|  | avgGgain = Sun_avg_Ggain |
| Cloudy day mode | avgRgain = clou_avg_Rgain |
|  | avgBgain = clou_avg_Bgain |
|  | avgGgain = clou_avg_Ggain |

For example, a first white balance gain (avgRgain, avgBgain, avgGgain)=(sun_avg_Rgain, sun_avg_Bgain, Sun_avg_Ggain) when the environmental illumination mode with which the image is captured by the camera is a sunny day mode. For example, a first white balance gain (avgRgain, avgBgain, avgGgain)=(clou_avg_Rgain, clou_avg_Bgain, clou_avg_Ggain) when the environmental illumination mode with which the image is captured by the camera is a cloudy day mode.

At S105, the second white balance gain with which the image is captured by the camera is calculated according to the three-primary-color values of the pixels in the image.

The pixel values of each pixel in the image consist of three-primary-colors, including red, blue and green.

In an optional implementation, the step of calculating the second white balance gain with which the image is captured by the camera according to the three-primary-color values of pixels in the image includes:

searching for a preset color gamut corresponding to the environmental illumination mode with which the image is captured by the camera in a prestored table of correspondence between environmental illumination modes and first white balance gains;

counting the number of white points in a preset color gamut range corresponding to the environmental illumination mode with which the image is captured by the camera, wherein, the number of the white points are the number of pixels satisfying a preset condition, and the preset condition is that a ratio of R value to G value and a ratio of B value to G value of a pixel in the image are in the preset color gamut range corresponding to the environmental illumination mode with which the image is captured by the camera;

counting an accumulated value of red, an accumulated value of green and an accumulated value of blue of the pixels corresponding to the number of the white points, and calculating a second white balance gain with which the image is captured by the camera according to the accumulated value of red, the accumulated value of green and the accumulated value of blue.

In an optional implementation, in order to determine a white balance gain and obtain a better image, calculating the second white balance gain of a camera with which the image is captured by the camera according to the three-primary-color values of the pixels in the image described above may include:

searching for the preset color gamut corresponding to the environmental illumination mode with which the image is captured by the camera in the prestored table of correspondence between environmental illumination modes and first white balance gains as a target preset color gamut;

determining pixels point satisfying a preset condition in the image, wherein the preset condition is that the ratio of R value to G value, the ratio of B value to G value of a pixel in the image are all in the target preset color gamut;

calculating an accumulated value of R value, an accumulated value of G value and an accumulated value of B value of pixels satisfying the preset condition, and calculating the second white balance gain with which the image is captured by the camera according to the accumulated value of R value, the accumulated value of G value and the accumulated value of B value.

Figure 3:
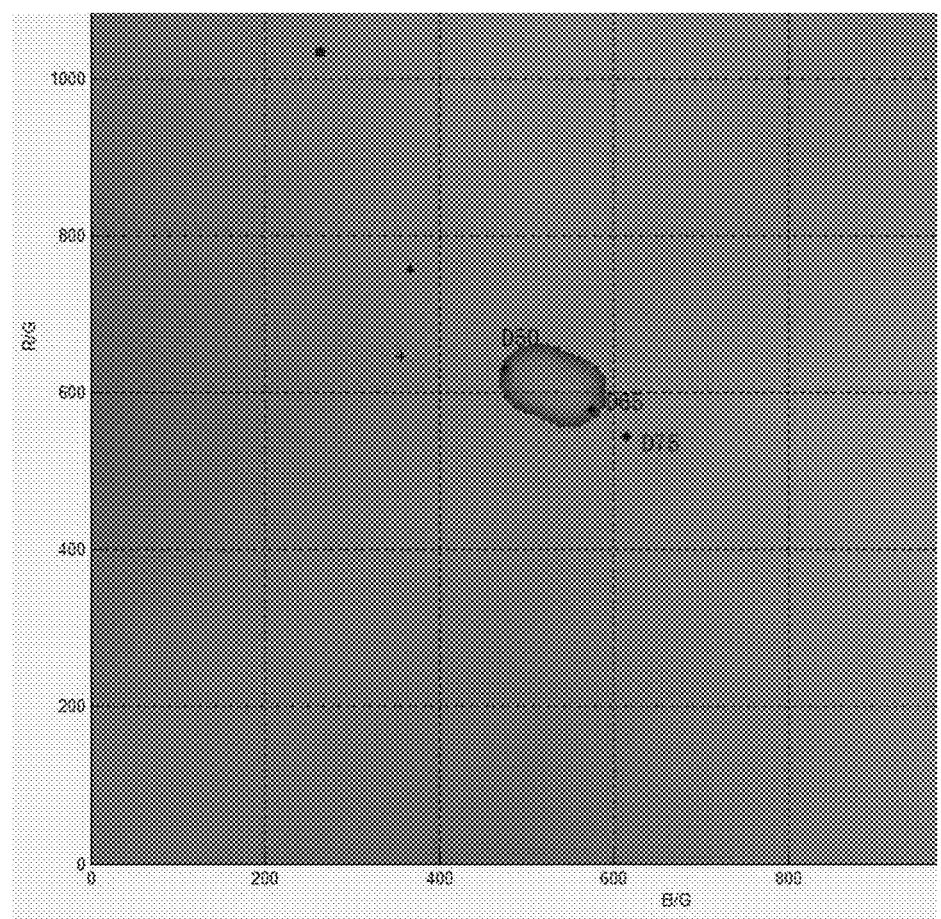
FIG. 3 is a preset color gamut diagram corresponding to the sunny day mode according to an embodiment of the application.
Figure 4:
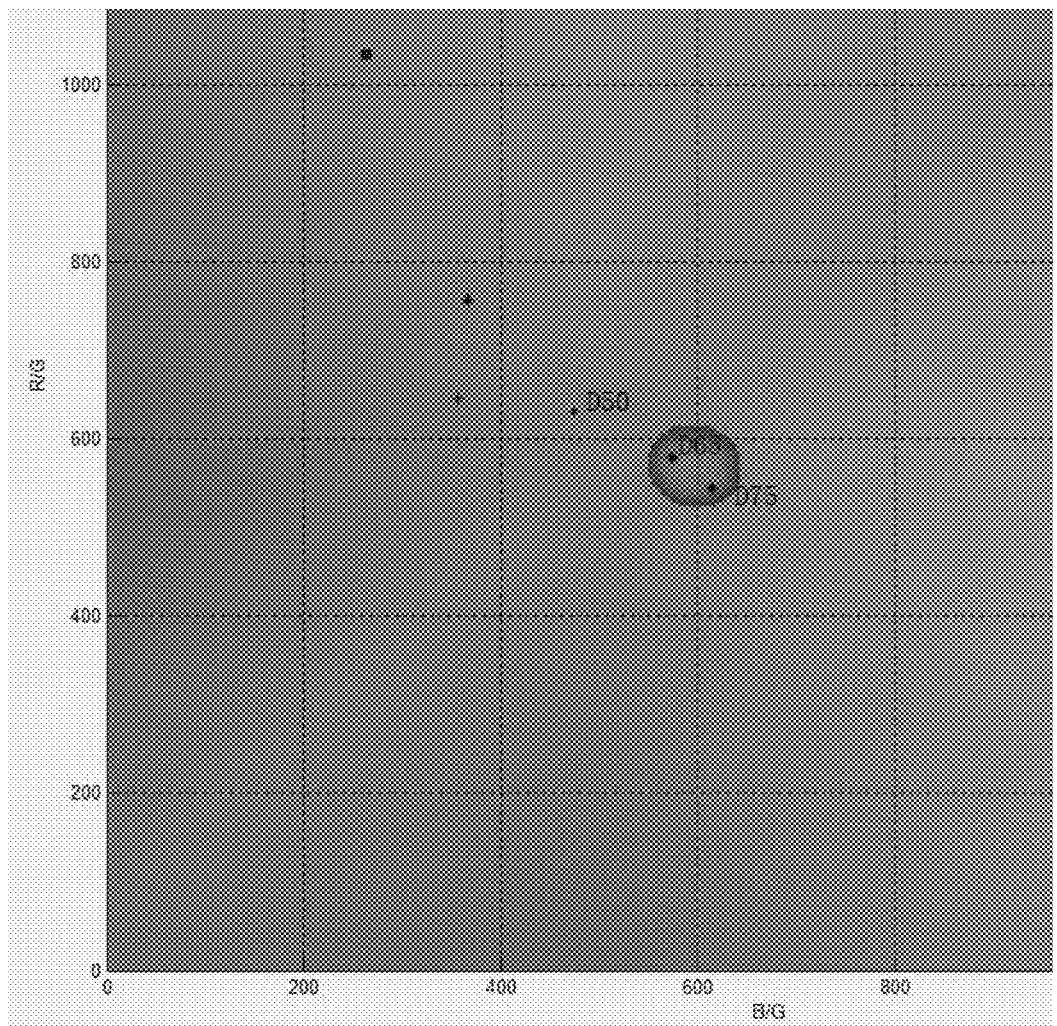
FIG. 4 is a preset color gamut diagram corresponding to the cloudy day mode according to an embodiment of the application.

Based on the above specific implementation, it should be noted that the white balance adjustment apparatus may search for a preset color gamut corresponding to the environmental illumination mode with which the image is captured by the camera in a prestored table of correspondence between environmental illumination modes and the preset color gamut, i.e., an environmental illumination mode corresponds a preset color gamut. FIG. 3 shows a preset color gamut corresponding to the sunny day mode, in which the black shadow in FIG. 3 is a threshold color gamut corresponding to the sunny day mode. FIG. 4 shows a preset color gamut corresponding to the cloudy day mode, in which the black shadow in FIG. 4 is a threshold color gamut corresponding to the cloudy day mode. In FIG. 3 and FIG. 4, the D50 represents a color temperature of 5000K of a simulated sunlight under standard light source, D65 represents a color temperature of 6500 k of a simulated blue sky sunlight under standard light source, and D75 represents a color temperature of 7500 k of a simulated northern average sunlight under standard light source.

That is to say, based on the above alternative implementation, in the embodiment of the application, a table of correspondence between environmental illumination modes and the preset color gamut is prestored. After determining the environmental illumination modes with which the image is captured by the camera, a preset color gamut corresponding to the environmental illumination mode may be searched in the above correspondence table and used as a target threshold color gamut. That is to say, each environmental illumination mode corresponds to a preset color gamut. FIG. 3 shows a preset color gamut corresponding to the sunny day mode, in which the black shadow in FIG. 3 is a preset color gamut corresponding to the sunny day mode. FIG. 4 shows the preset color gamut corresponding to the cloudy day mode, in which the black shadow in FIG. 4 is a preset color gamut corresponding to the cloudy day mode. In FIG. 3 and FIG. 4, the D50 represents a color temperature of 5000K of a simulated sunlight under standard light source, D65 represents a color temperature of 6500 k of a simulated blue sky sunlight under standard light source, and D75 represents a color temperature of 7500 k of a simulated northern average sunlight under standard light source.

Furthermore, the number of white points in a preset color gamut range corresponding to the environmental illumination mode with which the image is captured by the camera is counted, wherein, the number of the white points are the number of pixels satisfying a preset condition, and the preset condition is that a ratio of R value to G value (R/G) and a ratio of B value to G value (B/G) of a pixel in the image are in the preset color gamut range corresponding to the environmental illumination mode with which the image is captured by the camera. That is, if the ratio of R value to G value and the ratio of B value to G value of a pixel are in the preset color gamut range, the pixel is one white point.

That is to say, the pixel points satisfying the preset condition in the images are determined, and the number of the pixels satisfying the preset condition may be counted as the number of the white points. The preset condition may be that the ratio of the R value to the G value (R/G), the ratio of the B value to the G value (B/G) of the pixels in the image are within the target preset color gamut. That is, if the ratio of R value to G value and the ratio of B value to G value of a pixel are in the target preset color gamut range, the pixel may be used as one white point.

In the embodiment of the application, the preset color gamut may be NTSC color gamut (National Television Standards Committee color gamut) or SRGB (Standard Red Green Blue) color gamut, in which NTSC color gamut is a color gamut space standard formulated by the American Television Standards Committee. SRGB color gamut is a color language protocol developed by Microsoft in conjunction with Epson and Hewlett-Packard. The NTSC color gamut is much wider than the SRGB color gamut. In one case, the conversion formula between the NTSC color gamut and the SRGB color gamut is: 100% SRGB=72% NTSC.

When the above preset color gamut is SRGB color gamut, determining the pixel points satisfying the preset conditions in the images may include calculating the ratio of R value to G value, the ratio of B value to G value of the pixel points of the images separately, determining whether the ratio of R value to G value is in a preset color gamut, and determining whether the ratio of B value to G value is in the preset color gamut. When both the ratio of R value to G value and the ratio of B value to G value are in the preset color gamut, the ratio of R value to G value, the ratio of B value to G value of the pixels in the image are both in the target preset color gamut.

When the above preset color gamut is NTSC color gamut, determining the pixel points satisfying the preset condition in the image may include calculating the ratio of R value to G value, the ratio of B value to G value of the pixels in the image separately; converting the ratio of R value to G value, the ratio of B value to G value from SRGB color gamut to NTSC color gamut based on the above conversion formula, determining whether the converted ratio of R value to G value is in the preset color gamut, and determining whether the converted ratio of B value to G value is in the preset color gamut. When both of the converted ratio of R value to G value and the converted ratio of B value to G value are in the preset color gamut, the ratio of R value to G value, the ratio of B value to G value of the pixels in the image are both in the target preset color gamut.

After determining the pixels satisfying the preset condition, an accumulated value of R value, an accumulated value of G value and an accumulated value of B value of the above pixels satisfying the preset condition may be calculated respectively. Further, based on the accumulated value of the R value, the accumulated value of the G value, and the accumulated value of the B value, the second white balance gain with which the image is captured by the camera. That is, the accumulated values of red, green and blue of the pixel points may be calculated, and further, the second white balance gain with which the image is captured by the camera may be calculated according to the accumulated values of red, green and blue. The following formulas may be used:

$$\begin{cases} Rgain = sumG/sumR \\ Bgain = sumG/sumB \\ Ggain = 1 \end{cases}$$

wherein, (Rgain, Bgain, Ggain) is the second white balance gain with which the image is captured by the camera, sumR is the accumulated value of the R value, sumG is the accumulated value of the G value and sumB is the accumulated value of the B value.

In an embodiment of the application, the accuracy of the calculated second white balance gain may be improved to a certain extent by calculating the second white balance gain with which the image is captured by the camera based only on component values of the pixel values of the pixels satisfying the preset condition.

At S106, the white balance gain of the camera is adjusted according to the first white balance gain and the second white balance gain.

In a specific implementation, adjusting the white balance gain of the camera according to the first white balance gain and the second white balance gain includes:

adjusting the white balance gain of the camera to the second white balance gain if the number of white points in a preset range is greater than a preset threshold of the number of white points; wherein, the preset range is a preset color gamut corresponding to the environmental illumination mode with which the image is captured by the camera, and the preset color gamut corresponding to the environmental illumination mode with which the image is captured by the camera is determined based on a prestored table of correspondence between environmental illumination modes and the preset color gamuts; the number of the white points are the number of pixels satisfying a preset condition, the preset condition is that the ratio of R value to G value and the ratio of B value to G value of the pixels in the image are in the preset color gamut corresponding to the environmental illumination mode with which the image is captured by the camera;

adjusting the white balance gain of the camera to a weighted value between the second balance gain and the first white balance gain if the number of the white points is less than or equal to the preset threshold of the number of white points.

Specifically, if the number of the white points in the preset color gamut corresponding to the environmental illumination modes is larger than the preset threshold of the number of the white points, the white balance gain of the camera may be adjusted to the second white balance gain. If the number of the white points in the preset color gamut corresponding to the environmental illumination modes is larger than or equal to the preset threshold of the number of the white points, the white balance gain of the camera is adjusted to the weighted value between the second white balance gain and the first white balance gain.

In an optional implementation, the above step of adjusting the white balance gain of the camera according to the first white balance gain and the second white balance gain may include:

adjusting the white balance gain of the camera to the second white balance gain if the number of pixels satisfying a preset condition is larger than the preset threshold of the number of white points; wherein, the preset condition is that the ratio of R value to G value and the ratio of B value to G value of the pixels in the image are all in a target preset color gamut, and the target preset color gamut is a preset color gamut corresponding to the environmental illumination mode with which the image is captured by the camera;

adjusting the white balance gain of the camera to a weighted value between the second balance gain and the first white balance gain if the number of pixels satisfying the preset condition is less than or equal to the preset threshold of the number of white points.

The process of adjusting the white balance gain of the camera to the weighted value between the second balance gain and the first white balance gain may include: obtaining a final white balance gain based on the first white balance gain and its corresponding first preset weighted value, the second balance gain and its corresponding second preset weighted value, and adjusting the white balance gain of the camera to the final white balance gain.

For example, when sum_num≤th_sum, the white balance gain of the camera □r_gain, b_gain, g_gain□ is:

$$\begin{cases} r\_gain = (Rgian \times sum\_num + (th\_sum - sum\_num) \times avgRgian)/th\_sum \\ b\_gain = (Bgian \times sum\_num + (th\_sum - sum\_num) \times avgBgian)/th\_sum \\ g\_gain = 1 \end{cases}$$

For example, when sum_num>th_sum, the white balance gain of the camera □r_gain, b_gain, g_gain□ is:

$$\begin{cases} r\_gain = Rgian \\ b\_gain = Bgian \\ g\_gain = 1 \end{cases}$$

Wherein, sum_num is the number of the white points, th_sum is the preset threshold of the number of the white points, (Rgain,Bgain,Ggain) is the second white balance gain with which the image is captured by the camera, (avgRgain, avgBgain, avgGgain) is the first white balance gain.

In the embodiment of the application, on the basis of determining the environmental illumination modes with which the image is captured by the camera, the first white balance gain of the image is obtained, and then the white balance gain of the camera may be adjusted according to the first white balance gain and the second white balance gain calculated based on the three-primary-color values of the pixel points corresponding to the number of the white points. When adjusting the white balance gain of the camera, the three-primary-color values of the pixel points and the environmental illumination modes are combined, instead of only considering the single factor of the three-primary-color values of the pixel points. Therefore, the problem that the color difference of the image in different lighting environments cannot be effectively compensated in traditional technology may be solved, and then the better images may be obtained.

Figure 5:
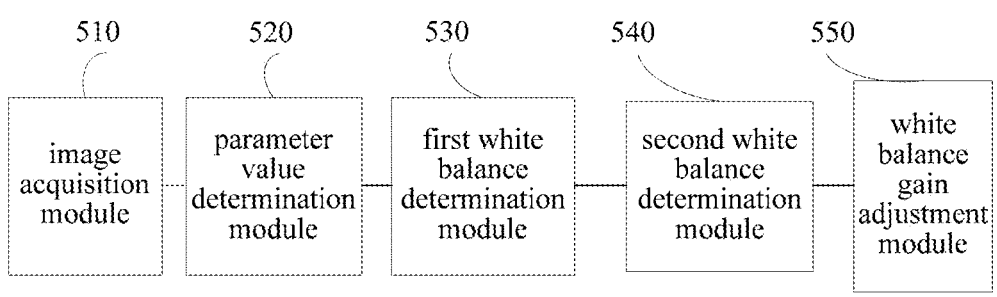
FIG. 5 is a schematic diagram of a white balance adjustment apparatus according to an embodiment of the application.

Corresponding to the above embodiment of the method, as shown in FIG. 5, the embodiments of present application also provide a white balance adjustment apparatus, which may include:

an image acquisition module 510, configured for obtaining an image currently captured by a camera;

a parameter value determination module 520, configured for determining a brightness value of the image and acquisition parameter values with which the image is captured by the camera, wherein the acquisition parameter values include an exposure time, an exposure gain and an aperture value with which the image is captured by the camera;

a first white balance determination module 530, configured for determining a first white balance gain for the image captured by the camera according to the brightness value, the exposure time, the exposure gain and the aperture value;

a second white balance determination module 540, configured for calculating a second white balance gain for the image captured by the camera according to three-primary-color values of pixels in the image; and a white balance gain adjustment module 550, configured for adjusting a white balance gain of the camera according to the first white balance gain and the second white balance gain.

In the embodiment of the application, the first white balance gain with which the image is captured by the camera may be determined based on the brightness value, exposure time, exposure gain and aperture value, wherein, the brightness value, exposure time, exposure gain and aperture value with which the image is captured by the camera may be to a certain extent used to characterize the actual environment where the images are taken, such as lighting environments; the second white balance gain with which the image is captured by the camera is calculated based on the three-primary-color values of the pixel points of the images, and then the white balance gain of the camera is adjusted according to the first white balance gain and the second white balance gain. When adjusting the white balance gain of the camera, we do not only consider the single factor of the three-primary-color values of the pixel points, but also combine the actual environment and the three-primary-color values of the pixel points. To a certain extent, it may solve the problem that the image color difference cannot be effectively compensated for in different lighting environments, and then obtain better images.

In the embodiment of the application, on the basis of determining the environmental illumination modes with which the image is captured by the camera, the first white balance gain of the image is obtained, and then the white balance gain of the camera may be adjusted according to the first white balance gain and the second white balance gain calculated based on the three-primary-color values of the pixel points corresponding to the number of the white points. When adjusting the white balance gain of the camera, the three-primary-color values of the pixel points corresponding to the number of the white points and the environmental illumination modes are combined, instead of only considering the single factor of the three-primary-color values of the pixel points. Therefore, the problem that the color difference of the image in different lighting environments cannot be effectively compensated in traditional technology may be solved, and then the better images may be obtained.

In an example, the first white balance determination module includes a determination unit and a searching unit;

the mode determination unit is configured for determining an environmental illumination mode with which the image is captured by the camera according to the brightness value, the exposure time, the exposure gain and the aperture value;

the searching unit is configured for searching for the first white balance gain corresponding to the environmental illumination mode for the image captured by the camera in a prestored table of correspondence between environmental illumination modes and first white balance gains.

In an example, the parameter value determination module 520 is specifically configured for:

obtaining the three-primary-color values of the image currently captured by the camera;

calculating the brightness value of the image according to the three-primary-color values and preset weighted proportions respectively corresponding to each of the three-primary-color values.

In an example, the mode determination unit is specifically configured for:

calculating a first illumination value of a current environment according to the brightness value, the exposure time, the exposure gain and the aperture value, wherein the current environment is an environment where the image is captured by the camera;

mapping the first illumination value to a second illumination value by a piecewise linear mapping method;

comparing the second illumination value with a plurality of illumination thresholds, and determining the environmental illumination mode with which the image is captured by the camera according to the comparison result.

In an example, the mode determination unit is specifically configured for calculating the first illumination value of the current environment by a formula of:

$$lux = \log((Y<<n)/(gain \times shutter/(Fn \times Fn)));$$

wherein, lux is the first illumination value, Y is the brightness value of the image, $Y<<n$ means that the Y is enlarged by $2^n$ times, gain is the exposure gain, shutter is the exposure time, Fn is the aperture value and n is a non-negative integer.

In an example, the mode determination unit is specifically configured for:

determining that the environmental illumination mode with which the image is captured by the camera is a sunny day mode, when the second illumination value is greater than or equal to a first illumination threshold;

determining that the environmental illumination mode with which the image is captured by the camera is a cloudy day mode, when the second illumination value is less than the first illumination threshold and greater than or equal to the second illumination threshold;

obtaining a time at which the image is captured by the camera, a scene mode configured by the user and stored historical data of white balance gain, when the second illumination value is less than the second illumination threshold and greater than or equal to the third illumination threshold, and determining whether the time at which the image is captured by the camera, the scene mode configured by the user and the stored historical data of white balance gain all satisfy an outdoor scene mode condition;

if so, determining that the environmental illumination mode with which the image is captured by the camera is a cloudy day mode, and if not, determining that the environmental illumination mode with which the image is captured by the camera is an artificial light source mode;

determining that the environmental illumination mode with which the image is captured by the camera is an artificial light source mode, when the second illumination value is less than the third illumination threshold.

In an example, the second white balance determination module 540 is specifically configured for:

searching for a preset color gamut corresponding to the environmental illumination mode with which the image is captured by the camera in a prestored table of correspondence between environmental illumination modes and first white balance gains;

counting the number of white points in a preset color gamut range corresponding to the environmental illumination mode with which the image is captured by the camera, wherein, the number of the white points are the number of pixels satisfying a preset condition, and the preset condition is that a ratio of R value to G value and a ratio of B value to G value of a pixel in the image are in the preset color gamut range corresponding to the environmental illumination mode with which the image is captured by the camera;

counting an accumulated value of red, an accumulated value of green and an accumulated value of blue of the pixels corresponding to the number of the white points, and calculating a second white balance gain with which the image is captured by the camera according to the accumulated value of red, the accumulated value of green and the accumulated value of blue.

In an example, the second white balance determination module 540 is specifically configured for:

searching for a preset color gamut corresponding to the environmental illumination mode with which the image is captured by the camera in a prestored table of correspondence between environmental illumination modes and first white balance gains as a target preset color gamut;

determining pixels satisfying a preset condition in the image, wherein the preset condition is that a ratio of R value to G value, a ratio of B value to G value of a pixel in the image are all in the target preset color gamut;

calculating an accumulated value of R value, an accumulated value of G value and an accumulated value of B value of the pixels satisfying the preset condition, and calculating the second white balance gain for the image captured by the camera according to the accumulated value of R value, the accumulated value of G value and the accumulated value of B value.

In an example, the second white balance determination module 540 is specifically configured for:

calculating the second white balance gain for the image captured by the camera according to the following formula:

$$\begin{cases} Rgain = sumG/sumR \\ Bgain = sumG/sumB \\ Ggain = 1 \end{cases}$$

wherein, (Rgain, Bgain, Ggain) is the second white balance gain for the image captured by the camera, sumR is the accumulated value of the R value, sumG is the accumulated value of the G value and sumB is the accumulated value of the B value.

In an example, the white balance gain adjustment module 550 is specifically configured for:

adjusting the white balance gain of the camera to the second white balance gain if the number of white points in a preset range is greater than a preset threshold of the number of white points; wherein, the preset range is a preset color gamut corresponding to the environmental illumination mode with which the image is captured by the camera, and the preset color gamut corresponding to the environmental illumination mode with which the image is captured by the camera is determined based on a prestored table of correspondence between environmental illumination modes and the preset color gamuts; the number of the white points are the number of pixels satisfying a preset condition, the preset condition is that the ratio of R value to G value and the ratio of B value to G value of the pixels in the image are in the preset color gamut corresponding to the environmental illumination mode with which the image is captured by the camera;

adjusting the white balance gain of the camera to a weighted value between the second balance gain and the first white balance gain if the number of the white points is less than or equal to the preset threshold of the number of white points.

In an example, the white balance gain adjustment module 550 is specifically configured for:

adjusting the white balance gain of the camera to the second white balance gain if the number of pixels satisfying the preset condition is larger than a preset threshold of the number of the white points; wherein, the preset condition is that a ratio of R value to G value and a ratio of B value to G value of a pixel in the image are all in a target preset color gamut, and the target preset color gamut is a preset color gamut corresponding to the environmental illumination mode with which the image is captured by the camera;

adjusting the white balance gain of the camera to a weighted value between the second balance gain and the first white balance gain if the number of pixels satisfying the preset conditions is less than or equal to the preset threshold of the number of the white points.

Figure 6:
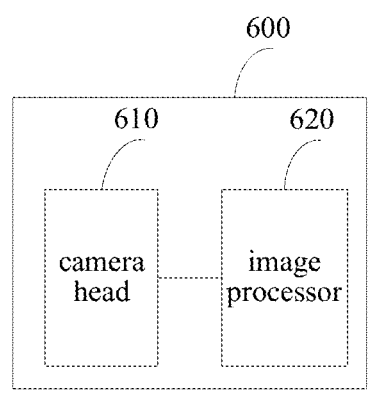
FIG. 6 is a camera according to an embodiment of the application.

An embodiment of the application also provides a camera. FIG. 6 provides a schematic diagram of the structure of the camera according to the embodiments of the application. The camera 600 includes:

a camera head 610, configured for capturing images;

an image processor 620, configured for obtaining an image currently captured by the camera head; determining a brightness value of the image and acquisition parameter values with which the image is captured by the camera head, wherein the acquisition parameter values include an exposure time, an exposure gain and an aperture value with which the image is captured by the camera; determining a first white balance gain for the image captured by the camera according to the brightness value, the exposure time, the exposure gain and the aperture value; calculating a second white balance gain for the image captured by the camera through the camera head according to three-primary-color values of pixels in the image; and adjusting a white balance gain of the camera according to the first white balance gain and the second white balance gain.

In the embodiment of the application, the first white balance gain with which the image is captured by the camera may be determined based on the brightness value, exposure time, exposure gain and aperture value, wherein, the brightness value, exposure time, exposure gain and aperture value with which the image is captured by the camera may be to a certain extent used to characterize the actual environment where the images are taken, such as lighting environments; the second white balance gain with which the image is captured by the camera is calculated based on the three-primary-color values of the pixel points of the images, and then the white balance gain of the camera is adjusted according to the first white balance gain and the second white balance gain. When adjusting the white balance gain of the camera, we do not only consider the single factor of the three-primary-color values of the pixel points, but also combine the actual environment and the three-primary-color values of the pixel points. To a certain extent, it may solve the problem that the image color difference cannot be effectively compensated for in different lighting environments, and then obtain better images.

In the embodiment of the application, on the basis of determining the environmental illumination modes with which the image is captured by the camera, the first white balance gain of the image is obtained, and then the white balance gain of the camera may be adjusted according to the first white balance gain and the second white balance gain calculated based on the three-primary-color values of the pixel points corresponding to the number of the white points. When adjusting the white balance gain of the camera, the three-primary-color values of the pixel points corresponding to the number of the white points and the environmental illumination modes are combined, instead of only considering the single factor of the three-primary-color values of the pixel points. Therefore, the problem that the color difference of the image in different lighting environments cannot be effectively compensated in traditional technology may be solved, and then the better images may be obtained.

In an example, the image processor 620 is specifically configured for:

determining an environmental illumination mode with which the image is captured by the camera according to the brightness value, the exposure time, the exposure gain and the aperture value;

searching for the first white balance gain corresponding to the environmental illumination mode for the image captured by the camera in a prestored table of correspondence between environmental illumination modes and first white balance gains.

In an example, the image processor 620 is specifically configured for:

obtaining the three-primary-color values of the image currently captured by the camera;

calculating the brightness value of the image according to the three-primary-color values and preset weighted proportions respectively corresponding to each of the three-primary-color values.

In an example, the image processor 620 is specifically configured for:

calculating a first illumination value of a current environment according to the brightness value, the exposure time, the exposure gain and the aperture value, wherein the current environment is an environment where the image is captured by the camera;

mapping the first illumination value to a second illumination value by a piecewise linear mapping method;

comparing the second illumination value with a plurality of illumination thresholds, and determining the environmental illumination mode with which the image is captured by the camera according to the comparison result.

In an example, the image processor 620 is specifically used for: calculating the first illumination value of the current environment by a formula of:

$$lux = \log((Y<<n)/(gain \times shutter/(Fn \times Fn)));$$

wherein, lux is the first illumination value, Y is the brightness value of the image, $Y<<n$ means that the Y is enlarged by $2^n$ times, gain is the exposure gain, shutter is the exposure time, Fn is the aperture value and n is a non-negative integer.

In an example, the image processor 620 is specifically configured for:

determining that the environmental illumination mode with which the image is captured by the camera is a sunny day mode, when the second illumination value is greater than or equal to a first illumination threshold;

determining that the environmental illumination mode with which the image is captured by the camera is a cloudy day mode, when the second illumination value is less than the first illumination threshold and greater than or equal to the second illumination threshold;

obtaining a time at which the image is captured by the camera, a scene mode configured by the user and stored historical data of white balance gain, when the second illumination value is less than the second illumination threshold and greater than or equal to the third illumination threshold, and determining whether the time at which the image is captured by the camera, the scene mode configured by the user and the stored historical data of white balance gain all satisfy an outdoor scene mode condition;

if so, determining that the environmental illumination mode with which the image is captured by the camera is a cloudy day mode, and if not, determining that the environmental illumination mode with which the image is captured by the camera is an artificial light source mode;

determining that the environmental illumination mode with which the image is captured by the camera is an artificial light source mode, when the second illumination value is less than the third illumination threshold.

In an example, the image processor 620 is specifically configured for:

searching for the first white balance gain corresponding to the environmental illumination mode with which the image is captured by the camera in a prestored table of correspondence between environmental illumination modes and first white balance gains.

In an example, the image processor 620 is specifically used for:

searching for a preset color gamut corresponding to the environmental illumination mode with which the image is captured by the camera in a prestored table of correspondence between environmental illumination modes and first white balance gains as a target preset color gamut;

determining pixels satisfying a preset condition in the image, wherein the preset condition is that a ratio of R value to G value, a ratio of B value to G value of a pixel in the image are all in the target preset color gamut;

calculating an accumulated value of R value, an accumulated value of G value and an accumulated value of B value of the pixels satisfying the preset condition, and calculating the second white balance gain for the image captured by the camera according to the accumulated value of R value, the accumulated value of G value and the accumulated value of B value.

In an example, the image processor 620 is specifically configured for calculating the second white balance gain for the image captured by the camera according to the following formula:

$$\begin{cases} Rgain = sumG/sumR \\ Bgain = sumG/sumB \\ Ggain = 1 \end{cases}$$

wherein, (Rgain, Bgain, Ggain) is the second white balance gain for the image captured by the camera, sumR is the accumulated value of the R value, sumG is the accumulated value of the G value and sumB is the accumulated value of the B value.

In an example, the image processor 620 is specifically used for:

adjusting the white balance gain of the camera to the second white balance gain if the number of white points in a preset range is greater than a preset threshold of the number of white points; wherein, the preset range is a preset color gamut corresponding to the environmental illumination mode with which the image is captured by the camera, and the preset color gamut corresponding to the environmental illumination mode with which the image is captured by the camera is determined based on a prestored table of correspondence between environmental illumination modes and the preset color gamuts; the number of the white points are the number of pixels satisfying a preset condition, the preset condition is that the ratio of R value to G value and the ratio of B value to G value of the pixels in the image are in the preset color gamut corresponding to the environmental illumination mode with which the image is captured by the camera;

adjusting the white balance gain of the camera to a weighted value between the second balance gain and the first white balance gain if the number of the white points is less than or equal to the preset threshold of the number of white points.

In an example, the image processor 620 is specifically configured for:

adjusting the white balance gain of the camera to the second white balance gain if the number of pixels satisfying the preset condition is larger than a preset threshold of the number of the white points; wherein, the preset condition is that a ratio of R value to G value and a ratio of B value to G value of a pixel in the image are all in a target preset color gamut, and the target preset color gamut is a preset color gamut corresponding to the environmental illumination mode with which the image is captured by the camera;

adjusting the white balance gain of the camera to a weighted value between the second balance gain and the first white balance gain if the number of pixels satisfying the preset conditions is less than or equal to the preset threshold of the number of the white points.

In addition, in accordance with the above method embodiments, an embodiment of the application also provides a machine-readable storage medium for storing machine-executable instructions. When invoked and executed by an image processor, the machine executable instructions urge the image processor to implement the white balance adjustment method described in the embodiments of this application.

In addition, in accordance with the above method embodiments, an embodiment of the application also provides an application program. When executed by a processor, the application program implements any of the steps of the white balance adjustment method described above in the embodiments of this application.

The embodiments of the apparatus/camera/storage medium are described briefly, since they are similar to the embodiments of the method, and for similar parts, one could refer to the corresponding description of the embodiments of the method.

It should be noted that the relationship terms herein such as "first", "second" and the like are only used for distinguishing one entity or operation from another entity or operation, but do not necessarily require or imply that there is any actual relationship or order between these entities or operations. Moreover, the terms "include", "comprise" or any other variants thereof are intended to cover non-exclusive inclusions, so that processes, methods, articles or devices comprising a series of elements comprise not only those elements listed but also those not specifically listed or the elements intrinsic to these processes, methods, articles, or devices. Without further limitations, elements defined by the sentences "comprise(s) a . . . " or "include(s) a . . . " do not exclude that there are other identical elements in the processes, methods, articles, or devices which include these elements.

All the embodiments are described in corresponding ways, same or similar parts in each of the embodiments can be referred to one another, and the parts emphasized are differences to other embodiments. Especially for embodiments of a system, since they are similar to embodiments of a method, the description thereof is relatively simple; the similar parts could refer to the parts in the description of embodiments of the method.

The embodiments described above are merely exemplary embodiments of the application, and not intended to limit the scope of the application. Any modifications, equivalents, improvements or the like within the spirit and principle of the application should be included in the scope of the application.

What is claimed is:

1. A white balance adjustment method, comprising:
   obtaining an image captured by a camera;
   determining a brightness value of the image and acquisition parameter values with which the image is captured by the camera, wherein the acquisition parameter values include an exposure time, an exposure gain and an aperture value;
   calculating a first illumination value according to the brightness value, the exposure time, the exposure gain and the aperture value, wherein the first illumination value characterizes an actual environment where the camera captures the image;
   mapping the first illumination value to a second illumination value by a piecewise linear mapping method;
   comparing the second illumination value with a plurality of illumination thresholds, and determining the environmental illumination mode with which the image is captured by the camera according to the comparison result;
   searching for the first parameter corresponding to the environmental illumination mode for the image captured by the camera in a prestored table of correspondence between environmental illumination modes and first parameters;
   calculating a second parameter according to three-primary-color values of pixels in the image; and
   adjusting a white balance gain of the camera according to the first parameter and the second parameter.

2. The method of claim 1, wherein, determining the brightness value of the image comprises:
   obtaining the three-primary-color values of the image captured by the camera;
   calculating the brightness value of the image according to the three-primary-color values and preset weighted proportions respectively corresponding to each of the three-primary-color values.

3. The method of claim 1, wherein, the first illumination value of the current environment is calculated by a formula of:

$$lux = \log((Y<<n)/(gain \times shutter/(Fn \times Fn)));$$

wherein, lux is the first illumination value, Y is the brightness value of the image, Y<<n means that the Y is enlarged by $2^n$ times, gain is the exposure gain, shutter is the exposure time, Fn is the aperture value and n is a non-negative integer.

4. The method of claim 1, wherein, determining the environmental illumination mode with which the image is captured by the camera according to the comparison result comprises:
   determining that the environmental illumination mode with which the image is captured by the camera is a sunny day mode, when the second illumination value is greater than or equal to a first illumination threshold.

5. The method of claim 1, wherein, calculating a second parameter according to the three-primary-color values of pixels in the images comprises;
   searching, in a prestored table of correspondence between environmental illumination modes and preset color gamuts, for a preset color gamut corresponding to the environmental illumination mode with which the image is captured by the camera;
   determining pixels satisfying a preset condition in the image, wherein the preset condition is that a ratio of R value to G value, a ratio of B value to G value of a pixel in the image are all in the searched color gamut;
   calculating an accumulated value of R value, an accumulated value of G value and an accumulated value of B value of the pixels satisfying the preset condition, and calculating the second parameter according to the accumulated value of R value, the accumulated value of G value and the accumulated value of B value.

6. The method of claim 5, wherein, calculating the second parameter according to the accumulated value of R value, the accumulated value of G value and the accumulated value of B value comprises:
   calculating the second parameter according to the following formula:

$$\begin{cases} Rgain = sumG/sumR \\ Bgain = sumG/sumB \\ Ggain = 1 \end{cases}$$

wherein, (Rgain,Bgain,Ggain) is the second parameter, sumR is the accumulated value of the R value, sumG is the accumulated value of the G value and sumB is the accumulated value of the B value.

7. The method of claim 1, wherein, adjusting the white balance gain of the camera according to the first parameter and the second parameter comprises:
adjusting the white balance gain of the camera to the second parameter if the number of pixels satisfying the preset condition is larger than a preset threshold of the number of white points; wherein, the preset condition is that a ratio of R value to G value and a ratio of B value to G value of a pixel in the image are all in a target preset color gamut, and the target preset color gamut is a preset color gamut corresponding to the environmental illumination mode with which the image is captured by the camera;
adjusting the white balance gain of the camera to a weighted value between the second parameter and the first parameter if the number of pixels satisfying the preset conditions is less than or equal to the preset threshold of the number of the white points.

8. The method of claim 7, wherein, adjusting the white balance gain of the camera to a weighted value between the second parameter and the first parameter comprises:
obtaining a final white balance gain based on the first parameter and a first preset weighted value corresponding the first parameter, the second parameter and a second preset weighted value corresponding the second parameter; and
adjusting the white balance gain of the camera to the final white balance gain.

9. A non-transitory machine readable storage medium for storing machine-executable instructions, wherein, the machine executable instructions are invoked and executed by an image processor to cause the image processor to implement the steps of the method of claim 1.

10. The method of claim 1, wherein, the environmental illumination mode comprises a sunny day mode, a cloudy day mode and an artificial light source mode.

11. The method of claim 1, wherein, determining the environmental illumination mode with which the image is captured by the camera according to the comparison result comprises:
determining that the environmental illumination mode with which the image is captured by the camera is a cloudy day mode, when the second illumination value is less than the first illumination threshold and greater than or equal to the second illumination threshold.

12. The method of claim 1, wherein, determining the environmental illumination mode with which the image is captured by the camera according to the comparison result comprises:
obtaining a time at which the image is captured by the camera, a scene mode configured by the user and stored historical data of white balance gain, when the second illumination value is less than the second illumination threshold and greater than or equal to the third illumination threshold, and determining whether the time at which the image is captured by the camera, the scene mode configured by the user and the stored historical data of white balance gain all satisfy a outdoor corresponding condition; if the time at which the image is captured by the camera, the scene mode configured by the user and the stored historical data of white balance gain all satisfy a corresponding outdoor condition, determining that the environmental illumination mode with which the image is captured by the camera is a cloudy day mode, and if the time at which the image is captured by the camera, the scene mode configured by the user and the stored historical data of white balance gain do not satisfy a corresponding outdoor condition, determining that the environmental illumination mode with which the image is captured by the camera is an artificial light source mode.

13. The method of claim 1, wherein, determining the environmental illumination mode with which the image is captured by the camera according to the comparison result comprises:
determining that the environmental illumination mode with which the image is captured by the camera is an artificial light source mode, when the second illumination value is less than the third illumination threshold.

14. A camera, comprising:
a camera head, configured for capturing images;
an image processor, configured for
obtaining an image captured by the camera head;
determining a brightness value of the image and acquisition parameter values, wherein the acquisition parameter values include an exposure time, an exposure gain and an aperture value with which the image is captured by the camera;
calculating a first illumination value according to the brightness value, the exposure time, the exposure gain and the aperture value, wherein the first illumination value characterizes an actual environment where the camera captures the image;
mapping the first illumination value to a second illumination value by a piecewise linear mapping method;
comparing the second illumination value with a plurality of illumination thresholds, and determining the environmental illumination mode with which the image is captured by the camera according to the comparison result;
searching for the first parameter corresponding to the environmental illumination mode for the image captured by the camera in a prestored table of correspondence between environmental illumination modes and first parameters;
calculating a second parameter according to three-primary-color values of pixels in the image; and
adjusting a white balance gain of the camera according to the first parameter and the second parameter.

* * * * *